(12) United States Patent
Tokutomi et al.

(10) Patent No.: US 7,987,583 B2
(45) Date of Patent: Aug. 2, 2011

(54) MAGNETIC HEAD SLIDER TESTING APPARATUS AND MAGNETIC HEAD SLIDER TESTING METHOD

(75) Inventors: Teruaki Tokutomi, Ashigarakami-gun (JP); Yoshinori Kitano, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 630 days.

(21) Appl. No.: 12/051,894

(22) Filed: Mar. 20, 2008

(65) Prior Publication Data

US 2008/0231983 A1 Sep. 25, 2008

(30) Foreign Application Priority Data

Mar. 22, 2007 (JP) ................................ 2007-074474

(51) Int. Cl.
 *B23P 19/00* (2006.01)
 *G11C 5/12* (2006.01)
 *H01M 2/04* (2006.01)

(52) U.S. Cl. ............... 29/737; 29/603.07; 29/603.09; 29/603.16; 29/603.18; 324/202; 324/210; 324/212; 324/260; 324/261; 360/121; 360/122; 360/317; 451/5; 451/8; 451/10; 451/36; 451/37

(58) Field of Classification Search .. 29/603.09–603.12, 29/63.15, 603.16, 603.18, 603.23, 737; 360/121, 360/122, 317; 451/5, 8, 10, 36, 37, 41; 324/202, 210, 212, 260, 261
See application file for complete search history.

(56) References Cited

U.S. PATENT DOCUMENTS

| | | | | |
|---|---|---|---|---|
| 5,517,111 A * | 5/1996 | Shelor | ........................... | 324/235 |
| 6,486,660 B1 * | 11/2002 | Luse et al. | ..................... | 324/210 |
| 7,355,393 B2 * | 4/2008 | Tokutomi et al. | ............. | 324/210 |

FOREIGN PATENT DOCUMENTS

| | | |
|---|---|---|
| JP | 10-124828 | 5/1998 |
| JP | 2000-260012 | 9/2000 |
| JP | 2006-351087 | 12/2006 |
| JP | 2007-48425 | 2/2007 |

* cited by examiner

*Primary Examiner* — Paul D Kim
(74) *Attorney, Agent, or Firm* — Mattingly & Malur, PC

(57) ABSTRACT

A step portion for mounting a row bar is provided at a table stepping down from the face of the table, and by lowering a pair of hooks crossing over the step portion in its width direction, a row bar held by the hooks is mounted on the step portion. While interposing the row bar mounted on the step portion between a pair of hooks and a side face of the step portion, the side in longitudinal direction of the row bar and the bottom face thereof are butted to the bottom face and the standing up side face of the step portion to position two axes of the row bar among XYZ directions, successively, positioning of the row bar in one remaining direction along longitudinal direction of the row bar mounted on the step portion is performed by moving the table in the one remaining axial direction.

7 Claims, 4 Drawing Sheets

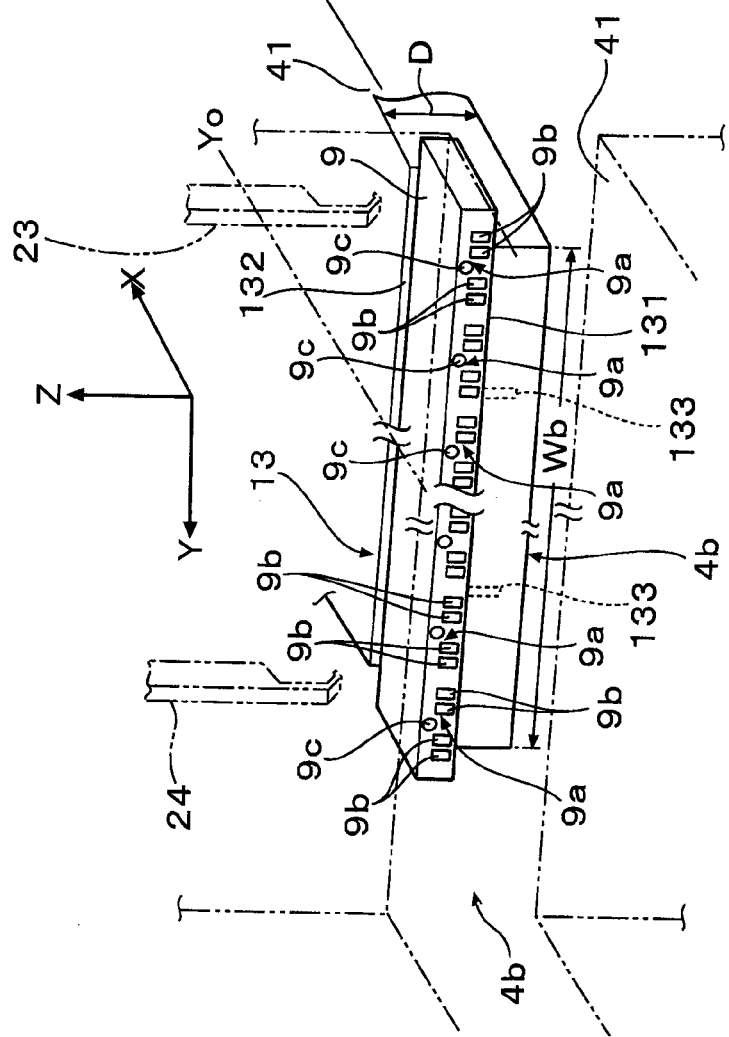

MAGNETIC HEAD SLIDER TESTING APPARATUS AND MAGNETIC HEAD SLIDER TESTING METHOD

FIELD OF THE INVENTION

The present invention relates to a magnetic head slider testing apparatus and a magnetic head slider testing method, and more specifically, in a testing apparatus of a composite magnetic head having an MR head (Magneto Resistive head), in particular, in a magnetic head slider testing apparatus which measures electrical characteristics of the MR head of respective head sliders in a prior process before cutting out into slider single bodies (chips) and in a state of long and narrow rectangular plate block (row bar) cut out in a row direction from a wafer where many head sliders are aligned, relates to an improvement in a magnetic head slider testing apparatus, which permits to position the row bar efficiently to a testing stage with a simple mechanism and with high accuracy.

BACKGROUND ART

With regard to a magnetic head for a hard disc device, recently, for use with an inductive head at the writing side, a composite magnetic head (which hereinafter will be called a composite head) in which such as an MR head, GMR head and TMR head (which hereinafter will be represented as an MR head) is used at the reading side.

Recording density of a hard disc has been steadily improved such as to a few ten gigabyte/inch. In addition, installations of an HDD to home electric appliances with digital technologies accelerate the improvement. For this reason, a demand for magnetic head assemblies, which are indispensable for the installation of the HDD, is increasing rapidly.

The magnetic head assembly is usually constituted by such as a head slider, which installs a composite head having an MR head and a suspension spring for supporting the same, the head slider is fixed to a head actuator such as a voice coil motor via the suspension spring.

The composite head in the head slider is formed integrally with the slider through a thin film process. Different from the inductive head at the recording side, in the MR head, a variety of defects such as a resistance defect, an insulation defect with a magnetic shield and an electric characteristic defect are likely caused in comparison with other types of heads. Therefore, an electrical characteristic testing of the magnetic heads including such as MR heads is performed under a condition a of slider single body (head slider).

For a defect testing of a head slider (in a slider single body condition) prior to assembling into a head assembly, a testing apparatus, which measures a reproducing characteristic of an MR head by applying externally a DC magnetic field to the MR head is disclosed and known from JP-A-2000-260012.

Further, for testing under assembled condition as a head assembly, a testing of an MR head in which while applying such as an AC recording magnetic field to the MR head and applying externally such as a DC magnetic field thereto, an output voltage waveform is obtained from the MR head to determine the characteristic is disclosed and known from JP-A-10-124828.

The size of a head slider is at most 1 mm square or less and on the side face at the trailing edge of the head slider four or six connection terminals for a composite head are provided. The height of the head slider is about 0.5 mm, and usually the magnetic head is provided at the trailing edge of the head slider together with the connection terminals. During testing of the head slider (in a slider single body condition), if the connection terminals of four or six are not surely contacted with a probe, the testing cannot be performed successfully.

Moreover, when measuring a reproducing characteristic of an MR head under a condition of applying a DC magnetic field externally, in these sorts of testing apparatus, an external magnetic field generating device has to be disposed extremely close to the head slider. Further, the measurement items have to cover a wide range of testing such as a quasi-magnetic response characteristic test (QUASI-TEST) of the MR head and a hysteresis characteristic test as a magnetic material. In addition, the testing has to be completed in a short time (about one second) for one piece of head slider.

Therefore, in order to enhance the efficiency of the head slider testing, it is proposed to measure the electric characteristic of an MR head under a condition of a row bar in a process before cutting out into head slider single bodies (chips). A row bar is a long and narrow rectangular plate block cut out from a wafer wherein head sliders are aligned along a length of about 3 cm~5 cm. The head sliders of about 40 pieces~60 pieces are aligned and formed in one row along a row direction of a wafer and what is cut out from the wafer is the row bar.

Row bars of about 20~30 pieces are usually collected and aligned in a perpendicular manner with a predetermined interval and are accommodated in a tray. It is studied to take up each of the row bars one by one from the tray with a handling robot, to transfer the same to a testing stage and to test the same. The row bars are roughly positioned, when being accommodated in the tray, and are accommodated therein with a small gap from the surrounding wall faces of the tray. Because of such positioning, dispersion of row bar positioning in the tray is caused in a range of about ±0.5 mm.

For this reason, in order to contact connection terminals of a row bar in a shape of a long and narrow rectangular plate block with a probe, the longitudinal direction of the row bar where the connection terminals are aligned has to be highly accurately positioned at the testing stage. One of methods conceived for that is to butt one of the latitudinal side faces of the row bar (plate block) to a reference plane provided in the longitudinal direction. In that, a positioning processing through butting is conceived wherein after positioning through this butting the row bar is transferred to the testing stage. For this purpose, a prestage for the positioning has to be provided. However, when performing such positioning through butting, it is difficult to perform the positioning processing through butting while holding a long and narrow row bar having a length of a few cm, moreover, since the positioning is performed during the processing, the transferring time of the row bar to the testing stage is prolonged, which causes a problem. Of course, positioning processings other than the positioning through butting are conceived, however, such processings are considered to require more time than that of the positioning through butting.

Further, the technology in which a head slider is set at a testing stage after performing a positioning processing through butting and a testing of the head slider is performed was invented by the present inventors and is already known as JP-A-2006-351087 and JP-A-2007-26552. Still further, a technology in which a row bar is set at a testing stage and a testing of the row bar is performed was invented by the present inventors and is already known as JP-A-2007-48425 (which corresponds to US Publication No. 2007-0013369-A1).

SUMMARY OF THE INVENTION

An object of the present invention is to resolve the above mentioned conventional problems and to provide a magnetic head slider test apparatus and a magnetic slider testing method, which permit to position a row bar efficiently to a testing stage with a simple mechanism and with high accuracy.

A magnetic head slider test apparatus or a magnetic slider testing method according to the present invention, which achieves the above object, is constituted by providing with a tray that accommodates head slider aligned blocks, a table that includes at the top end side thereof a step portion for mounting one of the head slider aligned blocks and a transfer mechanism that includes a pair of hooks and transfers therewith one of the head slider aligned blocks to the step portion.

The tray is what accommodates many head slider aligned blocks while arranging the longitudinal direction of the head slider aligned blocks along one axial direction among XYZ axial directions and aligning the head slider aligned blocks with a predetermined interval along another axial direction among the XYZ axial directions.

The pair of hooks is arranged above the tray along the one axial direction and is set in a narrower interval than a width of the head slider aligned block.

The table includes a step portion having a narrower width than an interval of the pair of hooks and stepping down at the top end side thereof to the direction perpendicular to a width direction thereof.

The transfer mechanism hangs up one of the head slider aligned blocks from the tray with the pair of hooks while hooking both end portions in the longitudinal direction thereof, transfers the hanged up head slider aligned block above the step portion so as to cross over the step portion in the width direction thereof and mounts the head slider aligned block while lowering the pair of hooks.

Further, in the present invention, while interposing the head slider aligned block mounted on the step portion between the pair of hooks and the step portion, a bottom face and a side face of the head slider aligned block are respectively butted to a bottom face and a side face of the step portion so as to be positioned in two axial directions among the XYZ axial directions and the table is moved in the remaining one axial direction along the longitudinal direction of the head slider aligned block mounted on the step portion so as to position the head slider aligned block in the remaining axial direction.

As in the manner as explained above, in the present invention, through provision of the step portion stepping down from the face of the table for mounting the head slider aligned block (row bar) in a long and narrow rectangular shape, and by lowering the pair of hooks so as to cross the step portion in the width direction thereof, the row bar held by the hooks is mounted on the step portion. Further, while interposing the row bar mounted on the step portion between the pair of hooks and the side face of the step portion, the back face side and its bottom face of the row bar in the longitudinal direction are butted with respect to the bottom face and the standing up side face of the step portion so as to position the row bar in two axial directions among the XYZ axial directions and, successively, the positioning of the row bar in the remaining one axial direction along the longitudinal direction of the row bar mounted on the step portion is performed through movement of the table in the remaining axial direction.

With regard to the positioning of the row bar in the remaining one axial direction, rough positioning of the row bars has usually been performed, and when the row bars are accommodated in the tray, the positioning thereof can be performed in a short time by moving the table a little from a reference position with respect to the row bar.

As a result, positioning of the row bar in two axial directions among the XYZ axial directions as well as of one having connection terminals in the remaining one axial direction corresponding to the longitudinal direction thereof can be performed accurately. In this instance, since the positioning processing in three axial directions can be performed successively after transferring the row bar to the step portion from the tray, the time required therefor can be shortened. Further, the rough positioning of the row bars when accommodating the same in the tray can be effected such as by butting the row bars to a side wall face of the tray.

Thereby, the total handling time required prior to positioning a row bar on the step portion of the testing table is shortened and throughput for the magnetic head slider testing can be enhanced.

Further, since the pair of hooks is arranged so as to cross the step portion under the state of hanging one row bar and the row bar mounted on the step portion is positioned by interposing the same between the pair of hooks and the stepping down step portion, no provision of a special positioning mechanism is required in the midway of transferring the row bar to the testing table.

As a result, according to the present invention, in the magnetic head slider testing apparatus, a row bar can be mounted on the testing stage while positioning the same efficiently and highly accurately with a simple mechanism, and thereby the row bar can be tested efficiently.

BRIEF DESCRIPTION OF THE DRAWINGS

FIG. 3(a) is a view for explaining a step portion of a Y table on which a row bar is mounted and FIG. 3(b) is a view for explaining a binarized image of a row bar end portion mounted on the step portion of the Y table.

DESCRIPTION OF THE PREFERRED EMBODIMENT

Figure 1:
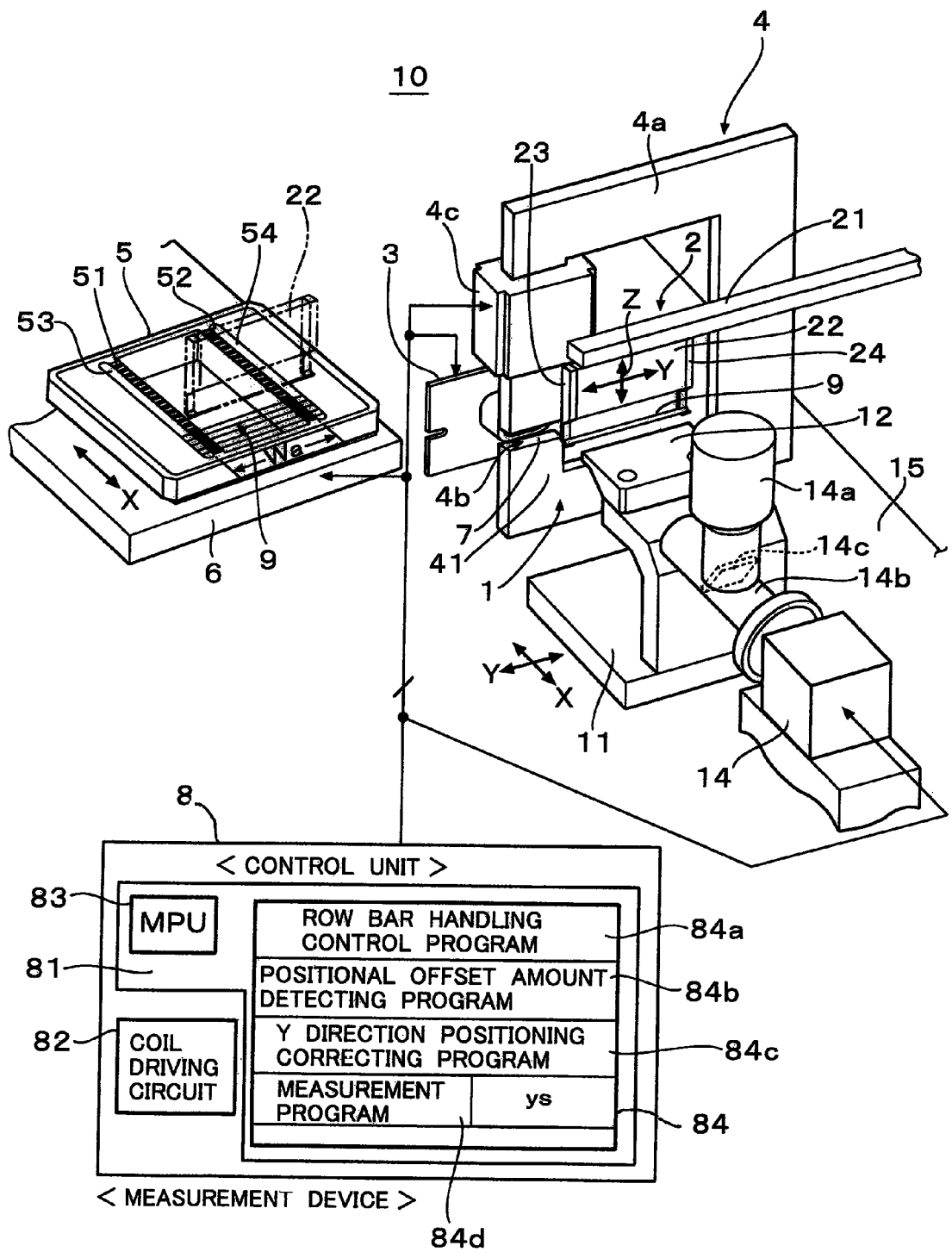
FIG. 1 is a schematic overview of a magnetic head slider testing apparatus to which the present invention is applied.

In FIG. 1, 10 is a magnetic head slider testing apparatus, wherein 1 is a testing stage therein, 2 a handling robot, 3 a probe card, 4 an external magnetic field generating device, 5 a tray, 6 a tray moving stage, 7 a measurement portion, 8 a measurement device and 9 a row bar wherein head slider single bodies are aligned (see FIGS. 3(a) and 3(b)).

In the tray 5, two plates 51 and 52 having saw teeth provided in parallel in the Y direction with a predetermined interval are provided in parallel. An inclining angle of the tooth contacting face on these plates 51 and 52 is set at 45° (see FIGS. 3(a) and 3(b)). The row bars 9 bridge between the two plates 51 and 52 in an angle of the contacting face of 45° and are supported thereby, and many row bars 9 (for example, 24 pieces) are aligned in the X direction and are accommodated in the tray 5.

Further, the longitudinal direction of the row bars 9 accommodated in the tray 5 runs along the Y direction and the rough positioning of the row bars 9 is performed by butting one of the longitudinal ends (a side face in the latitudinal direction) of the row bars 9 to a side wall of the tray 5 in Y direction. This rough positioning can be performed easily by setting one of the longitudinal ends (a side face in the latitudinal direction) of the row bars 9 downside in the tray 5 and the other end upside, and by tilting the tray 5. When the positioning accuracy of the handling robot 2 setting the row bars 9 in the tray 5 is high, since the row bars 9 are already accommodated through rough positioning, the above butting processing is not necessary.

Figure 4:
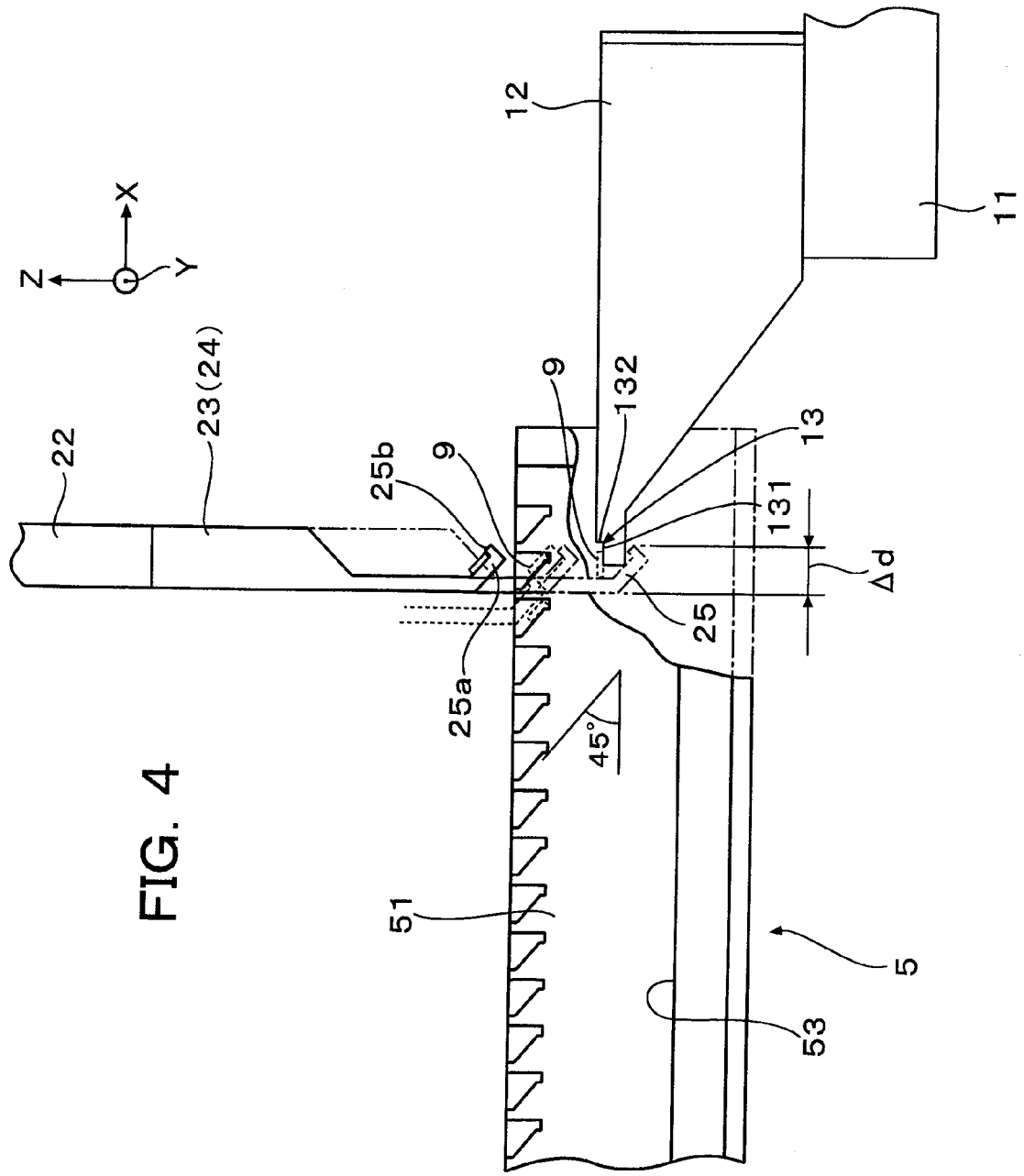
FIG. 4 is a view for explaining a relationship between the heights of the tray and the step portion and transportation of the row bar from the tray to the step portion.

The testing stage 1 is an XY moving stage, and is constituted by an X stage 11, a Y stage (table) 12 provided on the X stage 11, a step portion 13 for positioning (see FIG. 3(a) and FIG. 4) provided on the Y stage 12 and a camera 14 for measuring the positioning offset amount secured to a base 15.

Further, 14a is a light projection system of the camera 14 and is provided perpendicularly with respect to the optical axis of an imaging lens system 14b of the camera 14 at the midpoint thereof. At the intersection of the optical axis of the light projection system 14a and the optical axis of the imaging lens system 14b a half mirror 14c (shown in dotted line) having a slanting angle of 45° is built in.

Light from a light source of the light projection system 14a is reflected by the half mirror 14c and is irradiated to an imaging object (an end of a row bar 9). An image (the end of the row bar 9) obtained by the imaging lens system 14b is imaged through the half mirror 14c on a light receiving face of the camera 14 such as a CCD.

The positioning step portion 13 is provided at the top end side of the Y stage 12 as shown in FIG. 3(a) and FIG. 4, and serves as a mounting portion for the row bar 9 in a bench-type step stepping down from the surface of the Y stage 12.

Herein, the face having connection terminals 9b in the row bar 9 as shown in FIG. 3(a) is assumed as the front face of the row bar 9. The positioning step portion 13 includes a bottom face 131 and a side face 132. The bottom face of the row bar 9 and the back face of the row bar 9 (the opposite side face from the side where the connection terminals 9b are provided in the row bar 9 shown in FIG. 3(a)) are respectively butted to the bottom face 131 and the side face 132 so as to position two axial directions (X direction and Z direction) of the row bar 9. These butting faces respectively run in parallel with the X axis and the Y axis and serve as reference faces of perpendicular positional relationship for standing the row bar 9 opposite to a gap 4b formed in a frame core 4a of the measurement portion 7.

Further, since a linear movement mechanism for the X stage and the Y stage is a commonly available one, the illustration thereof in FIG. 1 is omitted.

Now, returning to FIG. 1, the measurement device 8 is constituted such as by a control unit 81 and a driving circuit 82. The control unit 81 is a controller computer in which a microprocessor (MPU) 83, a memory 84 and control programs 84a-84d carried by the memory 84 are built in.

Further, the memory 84 stores a row bar handling control program 84a, a positional offset amount detecting program 84b, a Y direction positioning correcting program 84c, a measurement program 84d and a normal runout length ys of the end of the row bar 9 from the positioning step portion 13.

The external magnetic field generating device 4 is an electromagnet, is constituted by the frame core 4a with the gap 4b at the position of the measurement portion 7 and a first coil 4c and a second coil wound around the frame core 4a (the second coil is not seen in the drawing, because the second coil is wound around the frame core 4a at a position back side of the Y stage 12) and is secured to the base 15 of the magnetic head slider testing apparatus 10 via a bracket. The external magnetic field generating device 4 is driven when the two coils receive electric power supply from the coil driving circuit 82 in the measurement device 8.

The gap 4b corresponds to the lateral cross-sectional shape of the frame core 4a and forms a rectangular block space larger than the row bar 9. The probe card 3 and the Y stage 12 are provided in the X direction (lateral direction) perpendicular to one side 41 of the frame core 4a wound with the first coil 4c and in a space in the frame width direction of the frame core 4a so as to oppose each other via the gap 4b. The one side 41 stands up in the Z direction.

The Y stage 12 moves in the X direction through driving of the X stage 11 and advances and retreats with respect to the gap 4b. When the Y stage 12 is advanced, the positioning step portion 13 provided at the top end side thereof enters in the gap 4b. In this moment the row bar 9 is received inside the space of the gap 4b.

The probe card 3 is secured to the base 15 via a device frame (not illustrated) and is connected to the measurement device 8, although the top end portion of the probe is not seen in FIG. 1, because the same is hidden by the one side 41 of the frame core 4a, the top end portion of the probe is located in the measurement portion 7 so as to oppose the Y stage 12 and the connection terminals thereof protrude into the gap 4b from the opposite side of the Y stage 12 with respect to the gap 4b. Measured signals obtained from the probe card 3 are input to the measurement device 8.

In FIG. 1, the tray moving stage 6 is an X direction moving stage carrying the tray 5, moves the tray 5 in the X direction to move a row bar 9 of the testing object to a position in the X axis corresponding to a hanging up position (intersection between the moving axis of the tray moving stage 6 and the moving axis of the handling robot 2) in the Y direction of a hook hand 22 of the handling robot 2 that hangs up and moves the row bar 9 in the Y direction. The position of the tray 5 is controlled by the measurement device 8 via the tray moving stage 6.

The handling robot 2 includes an arm 21 moving in the XY directions and the hook hand 22 attached to the arm 21 at its top end side, and a pair of hook fingers 23 and 24 are provided at the front and back end portions in the Y direction of the hook hand 22. These hook fingers 23 and 24 are attached to the hook hand 22 in a manner movable up and down and back and forth by an amount of Δd. As shown in FIG. 2(c), the interval between the hook fingers 23 and 24 is determined as Wa+α (α=a small value). As shown in connection with the tray 5 in FIG. 1, the interval Wa corresponds to the interval between groove holes 53 and 54 provided on the tray 5 at both sides of the row bars 9 (see FIG. 1 and FIG. 2(a)). When the hook hand 22 is lowered, the pair of hook fingers 23 and 24 having the interval of Wa+α are respectively inserted into the groove holes 53 and 54.

Figure 2A:
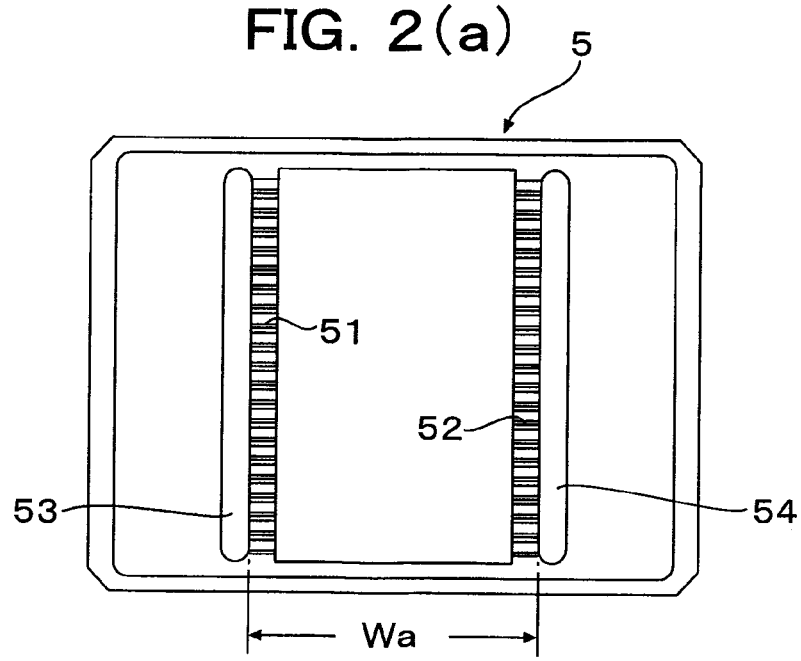
FIG. 2(a) is a top view of a tray.
Figure 2B:
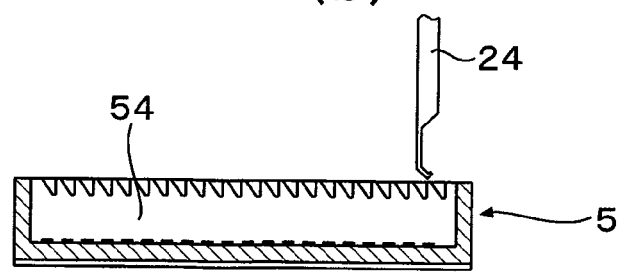
FIG. 2(b) is a cross sectional view at the center of the side of the tray and FIG. 2(c) is a front view of the tray.
Figure 2C:
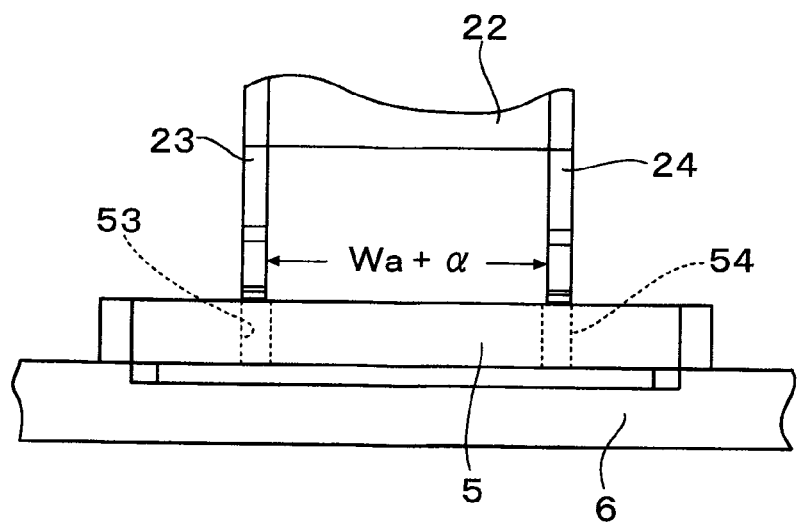

FIG. 2(a) is a top view of the tray 5, FIG. 2(b) is a cross-sectional view at the center of the side of the tray 5 and FIG. 2(c) is a front view of the tray 5.

As shown in the top view in FIG. 2(a), in the tray 5, the groove holes 53 and 54 are respectively provided along the outside of the plates 51 and 52, as shown in the front view in FIG. 2(c), the hook fingers 23 and 24 lower at the same time from above the tray 5, reach the surface of the tray 5, further lower and are inserted into the groove holes 53 and 54 and hang up the row bar 9 by hooking both ends of the row bar 9 with the hook portion thereof (see the hook hand 22 above the tray 5 shown by dotted line in FIG. 1). Then, the handling robot 2 causes the hook hand 22 to move in the Y direction and to hang the row bar 9, transfers the same in the Y direction, carries the same above the positioning step portion 13, stops the row bar 9 under hanging state at the position corresponding to the positioning step portion 13 (see the hook hand 22 above the tray 5 shown by solid line in FIG. 1) and lowers the row bar 9 from this position to the positioning step portion 13 to mount the same thereon.

Further, the handling robot 2 causes to reciprocate the hook hand 22 between the hanging up position of the hook hand 22 of the row bar 9 from the tray 5 (the position of the hook hand 22 shown by dotted line in FIG. 1) and the mounting position of the hook hand 22 of the row bar 9 on the positioning step portion 13 (the position of the hook hand 22 shown by solid line in FIG. 1). In other words, the hanging up position of the row bar 9 from the tray 5 and the stop position for mounting the row bar 9 on the positioning step portion 13 are on a same axis in the Y direction. Thereby, the transfer processing time of the row bar 9 is shortened.

FIG. 3(a) is a view for explaining the positioning step portion 13 in the Y table 12 for mounting the row bar 9. As shown in FIG. 3(a), the positioning step portion 13 forms a stepping down step at the front face side thereof facing the side of the gap 4b and opposes to the top end portion (connection terminals) of the probe card 3 while interposing the gap 4b therebetween. Further, 9a is a head slider portion before cutting out into individual head sliders from a row bar 9.

The Y table 12 as shown in FIG. 3(a) is set at position Y0 on the Y axis (the reference position of the Y table). Namely, the center in the width direction of the positioning step portion 13 is positioned at the reference position Y0 in the Y direction so as to oppose the positioning step portion 13 to the gap 4b. The width direction of the positioning step portion 13 corresponds to the longitudinal direction of the row bar 9 and coincides with the Y direction.

The thickness D of the positioning step portion 13 is smaller than the distance of the gap 4b. Therefore, when the row bar 9 is tested, the positioning step portion 13 provided on the Y table 12 is advanced toward the gap 4b and the positioning step portion 13 of the Y table 12 is inserted into the gap 4b. Many connection terminals 9b of the row bar 9 are positioned in the space of the gap 4b substantially at the center portion in the vertical direction and respectively contact to many contact terminals of the probe card 3 at the top end portion thereof inside the gap 4b. Under this condition, the magnetic field is applied externally to the row bar 9 in the gap 4b and testing of the respective sliders in the row bar 9 is performed.

FIG. 4 is a view for explaining a relationship between the heights of the tray and the step portion and transportation of the row bar from the tray to the step portion.

In FIG. 4, in order to show the height relationship between the tray 5 and the positioning step portion 13, a part of the top end side of the tray 5 is cut out so that the top end side of the positioning step portion 13 located inner part thereof can be seen.

The height of the positioning step portion 13 is somewhat at a lower position than the accommodating position of the row bars 9 in the tray 5. Since the hanging up position of the row bar 9 and the stop position for mounting the row bar 9 on the positioning step portion 13 are on a same axis in the Y direction, the hanged up row bar 9 partly overlaps with the position of the positioning step portion 13 with regard to the Z direction.

First of all, the operation of the hook finger 23 (24) that hangs up a row bar 9 from the tray 5 will be explained.

As shown in FIG. 4, the handling robot 2 lowers the arm 21 in the Z direction, and at the same time lowers the pair of hook fingers 23 and 24 together with the hook hand 22 from the position of the hook hand 22 shown by dotted line in FIG. 1, inserts the same into the groove holes 53 (54) and lowers above a row bar 9 at the backside by one from the top row bar 9 of the test object bridged in the tray 5 in an angle of 45° in clockwise direction. Thereby, the tops of the hook fingers 23 and 24 are positioned at the backside of the top row bar 9 to be hanged up. Subsequently, the pair of hook fingers 23 and 24 are advanced and lowered by the hook hand 22 along the surface of the backside row bar 9 with a slanting angle of 45° to advance the same by Δd in the X direction and to position the same at the lower side of the row bar 9 at the front side by one.

As shown in the drawing, a hook 25 of the hook fingers 23 and 24 includes an inclining portion 25a formed by bending the vertically extending top end of the hook fingers 23 and 24 to an inclination angle of 45° in the anticlockwise direction in the drawing and a standing up portion 25b of which top is further bent in the anticlockwise direction by 90° from the inclined portion 25a and which is shorter than the inclined portion 25a. The claw width of the hook 25 in the X direction is Δd. Therefore, the standing up portion 25b locating at this moment at the backside of the row bar 9 to be hanged up moves by Δd and is positioned below the row bar 9 to be hanged up and at the front side thereof as shown by dotted line. Further, the width of the inclined row bar 9 in the X direction on the tray 5 is shorter than Δd—two times the plate thickness of the hook fingers 23 and 24 as shown in the drawing.

As a result, through the movement by Δd, the hook 25 is located below the top row bar 9 at the position of hooking the row bar 9. After the movement of Δd, the handling robot 2 raises the hook fingers 23 and 24 at the same time together with the hook hand 22 and hangs up the top row bar 9 from the tray 5. When the top row bar 9 is hanged up, the tray 5 is pitch-transferred, and the next row bar 9 moves to the top position. The handling robot 2 raises the hook hand 22 under the condition of hanging the top row bar 9 and returns the hook hand 22 to the position shown by the dotted line. Thereby, the hook fingers 23 and 24 and the row bar 9 rise to a position above the tray 5 as shown by solid line in FIG. 4. Under this condition, the hook hand 22 is moved by retreating the arm 21 (see FIG. 1) along the Y direction and is returned up to the position shown by the solid line in FIG. 1. As a result, without changing the height of the hook hand 22, the hook fingers 23 and 24 are positioned above the positioning step portion 13 as shown by the solid line in FIG. 4.

The relationship of the hook fingers 23 and 24 and the positioning step portion 13 is in a state of opposing each other so that the row bar 9 is arranged being interposed between the hook fingers 23 and 24 and the positioning step portion 13. Namely, as shown in FIG. 4, the bent standing up portions 25b in the hooks 25 of the hook fingers 23 and 24 respectively face the side of the positioning step portion 13 and the inclined portion 25a partly overlaps in the X direction with the top end side of the positioning step portion 13.

The width Wb (Wb<Wa) of the positioning step portion 13 as shown in FIG. 3(a) runs along the longitudinal direction of the row bar 9 and is somewhat narrower than the width Wa of the hook fingers 23 and 24. Therefore, the hook fingers 23 and 24 are positioned above the positioning step portion 13 and at the outside in the width direction of the positioning step portion 13, and are arranged in a state across the positioning step portion 13 (see FIG. 1, FIG. 3(a) and FIG. 4). This state corresponds to the position of the hook hand 22 shown by solid line in FIG. 1.

Subsequently, when the handling robot 2 lowers at the same time the pair of hook fingers 23 and 24 together with the hook hand 22 from the position of the hook hand 22 shown by solid line in FIG. 1, the row bar 9 lowers straight together with the hook fingers 23 and 24 above from the positioning step portion 13 as shown in FIG. 4 and when the standing up portion 25b of the hook 25 is lowered below the bottom 131 of the positioning step portion 13, about a half of the bottom in the latitudinal direction of the row bar 9 is mounted on the bottom 131 of the positioning step portion 13. At this moment, a small gap is formed between the back face of the row bar 9 and the side face 132 of the positioning step portion 13.

In other words, the position of the hook hand 22 arranged above the positioning step portion 13 as shown by solid line in FIG. 1 has a positional relationship that when the hook hand 22 is lowered, the pair of hook fingers 23 and 24 cross over the positioning step portion 13 above the positioning step portion 13 and about a half of the bottom in the latitudinal direction of the row bar 9 overlaps the bottom 131 of the positioning step portion 13.

Since the row bar 9 is arranged between the hook fingers 23 and 24 and the positioning step portion 13 in the X direction and interposed thereby, either by advancing the Y stage 12 toward the gap 4b or by advancing the hook hand 22 by a predetermined amount toward the positioning step portion 13, the hook fingers 23 and 24 are advanced toward the positioning step portion 13 to butt the back face of the row bar 9 to the side face 132, thereby, the bottom face as well as the side face in the longitudinal direction of the row bar 9 are positioned at the same time.

Since the lengths in the latitudinal and longitudinal directions of the row bar 9 are constant, the positioning of the row bar 9 in the two axial directions of the X and Z directions is completed through the above processing. After this positioning through butting, the row bar 9 is sucked and secured on the positioning step portion 13 by suction holes 133 (see the dotted portions in FIG. 3(a)) provided at the bottom face of the positioning step portion 13.

Subsequently, the handling robot 2 causes to retreat the hook fingers 23 and 24 with the hook hand 22 from the positioning step portion 13 by more than the back and forth width of the row bar 9, to position the standing up portion 25b of the hook 25 outside the position of the row bar 9 mounted on the positioning step portion 13 and to sidetrack the hook fingers 23 and 24. Then the handling robot 2 raises the arm 21 to raise the hook fingers 23 and 24 above the positioning step portion 13 and returns the hook hand 22 to the position shown by the solid line in FIG. 1.

The above handling control of the row bar 9 by the handling robot 2 is performed by the MPU 83 through execution of the row bar handling control program 84a.

Since the hook fingers 23 and 24 hook both ends of the row bar 9 and position the same on the positioning step portion 13, both ends of the row bar 9 for the hooking having a length corresponding to the thickness of the hook fingers 23 and 24 or more protrude from the ends of the positioning step portion 13 as shown in FIG. 3(a).

Therefore, the protruding end portions of the row bar 9 are imaged with the camera 14 and are utilized to position the row bar 9 in the remaining Y direction. Namely, after sidetracking the pair of hook fingers 23 and 24 from the positioning step portion 13, the hook hand 22 is raised, and with regard to the row bar 9 sucked and secured through the suction holes 133, the control unit 81 causes to be imaged with the camera 14 the protruding end portion of the row bar 9 protruding from the end portion of the positioning step portion 13 as shown at the right side in the drawing and corrects the position in the Y direction of the row bar 9.

As explained in the above, with regard to the position of the Y table 12, the center in the width direction thereof is set at the reference position Y0 in Y axis direction. Therefore, from the image of the protruding end of the row bar 9 obtained by the camera 14, the mounting offset of the row bar 9 in the Y direction is detected.

Namely, pixel number y from the end of the Y table 12 to the end of the row bar 9 in the Y axis direction is calculated from the image of the end portion taken to determine how the calculated pixel number y deviates from those of no positional offset, and, thereby, the offset amount of the row bar 9 with respect to the reference position Y0 of the Y table 12 in the axial direction is calculated.

For this reason, the memory 84 in advance stores a pixel number ys measured from the image from the end of the positioning step portion 13 to the end of the row bar 9 taken by the camera 14, when the row bar 9 is mounted on the positioning step portion 13 when the Y table 12 is at the reference position and further the row bar 9 is positioned without positional offset error.

When the pair of hook fingers 23 and 24 sidetracks from the positioning step portion 13, the control unit 81 executes the positional offset amount detection program 84b for detecting the positional offset amount of the row bar 9, and the protruding end portion of the row bar 9 at the right side of the drawing is imaged by the camera 14. Then the obtained image is binarized and the image data as shown in FIG. 3(b) are obtained which are stored in the memory 84.

As shown in FIG. 3(b), when the sampled image is binarized, an image 85 is obtained where only the end portion of the row bar 9 protruding from the positioning step portion 13 is shown in a white frame 86. This is because that the end portion of the row bar 9 is at the front position of the camera 14, the light from the light projection system 14a is directly irradiated thereto and the row bar 9 is a material primarily constituted by silicon having a high reflection coefficient. On the other hand, since the side face of the positioning step portion 13 is in parallel with respect to the light from the light projection system 14a and sufficient light is not irradiated thereto, an image of gray level appears. Therefore, when the image is binarized, the portion gives a black level. Further, the space around the end portion of the row bar 9 also gives black level because of no reflection light.

When the image as shown in FIG. 3(b) is obtained, the MPU 83 selects the end portion of the row bar 9 at the left side of the drawing as a coordinate origin for image coordinate of ZY from this image data and calculates pixel number y in the Y direction corresponding to the protruding end portion of the row bar 9.

Further, after reading out the pixel number ys for no positional offset from the memory, the offset amount of yi is calculated from yi=y−ys.

Subsequently, the MPU 83 executes the Y direction positioning correction program 84c to calculate distance ΔY corresponding to the pixel number yi from the magnification ratio of the image taken by the camera 14 and causes the Y table 12 to move in the Y direction by ΔY from the reference position Y0 in the direction opposite to the offsetting direction.

Thereby, the position of the end portion of the row bar 9 assumes the position of the pixel number of ys where no positional offset from the reference position Y0 is given and is corrected at the reference position Y0 where the connection terminals 9b contact the top end portion of the probe.

Further, since the positioning in the Y axis direction of the row bar 9 is roughly performed by the tray 5, the amount of movement for positioning in the Y direction of the raw bar 9 is small and requires only a short time.

Accordingly, the positioning of the row bar 9 in the XYZ coordinates is completed.

Further, such positioning processing of the row bar 9 in the Y direction making use of the image taken by the camera 14 can be performed a plurality of times.

As a result, the row bar 9 sucked on the positioning step portion 13 is positioned with regard to the XYZ coordinates and placed in a state where the connection terminals 9b surely contact to the probes of the probe card.

After this, the MPU 83 executes the measurement program 84d, and causes the X stage 11 to advance toward the gap 4b by a predetermined amount, to insert the positioning step portion 13 of the Y stage 12 into the gap 4b, to contact the connection terminals 9b to the probe top end of the probe card 3 and to enter the test of the row bar 9.

In the present embodiment as has been explained hitherto, with regard to the relationship between the hook fingers 23 and 24 and the positioning step portion 13, although the hook fingers 23 and 24 and the positioning step portion 13 are arranged in opposing relation in the X axis direction so as to interpose the row bar 9 therebetween, the hook fingers 23 and 24 can be arranged at the same side with the positioning step portion 13.

In this arrangement, the hook hand 22 is turned by 180°, the front and back of the hook fingers 23 and 24 are inverted compared to those shown in the drawings and the standing up portion 25b of the hook 25 is aligned in the direction of positioning step portion 13.

When picking up a row bar 9 from the tray 5, the hook fingers 23 and 24 may be inserted into groove holes 53 and 54 from the front side of the row bar 9 and pick up the row bar 9. Under this state, the inclining portion 25a is formed by bending the vertically extending top end of the hook fingers 23 and 24 to an inclination angle of 45° in the clockwise direction and the standing up portion 25b is formed by bending in the clockwise direction by 90° from the top of the inclined portion 25a. The hook fingers 23 and 24 are located above the positioning step portion 13. In this instance, since the standing up portion 25b of the hook 25 opposes the positioning step portion 13, the row bar 9 can be mounted on the positioning step portion 13 in the like manner as in the embodiment and the positioning through butting in the XZ directions can also be effected.

In the present embodiment, although the frame core for the external magnetic field generating device is a rectangular shape, the present invention is not limited to the rectangular shape.

Further, in the present embodiment, the testing of row bars of MR head composite heads is exemplified, however, the present invention of course is not limited to the testing of the MR head composite heads.

Further, since the axes in XYZ in the embodiment are relative ones, the longitudinal direction of row bars is not limited to the Y direction.

Further, since with regard to the row bar handling control program 84a, contents of operation are explained in detail in the present specification and with regard to the positional offset amount detection program 84c and the Y direction positioning correction program 84c, the calculation thereof is explained by showing the measured image, and the flowcharts for these processings are omitted.

The invention claimed is:

1. A magnetic head slider testing apparatus that tests characteristics of a magnetic head carried on respective head sliders in a rectangular plate shaped head slider aligned block where many head sliders are aligned prior to being cut out into the head sliders comprising:

a tray that accommodates many head slider aligned blocks while arranging the longitudinal direction of the head slider aligned blocks along one axial direction among XYZ axial directions and aligning and supporting the head slider aligned blocks with a predetermined interval along another axial direction among the XYZ axial directions;

a table includes a step portion having a width shorter than a length of the head slider aligned block in its longitudinal direction and stepping down at the top end side of the table to the direction perpendicular to a width direction of the table on which one of the head slider aligned blocks is mounted;

a pair of hooks that is arranged above the tray along the one axial direction and has a narrower interval than the length of the longitudinal direction of the head slider aligned block and a wider interval than the width of the step portion; and a transfer mechanism that hangs up one of the head slider aligned blocks from the tray with the pair of hooks while hooking both end portions in the longitudinal direction thereof, transfers the head slider aligned block that is hung up above the step portion, lowers the pair of hooks to the step portion in a state of crossing over the step portion in the width direction thereof and mounts the head slider aligned block on the step portion, wherein the head slider aligned block mounted on the step portion is positioned in two axial directions among XYZ directions by being interposed between the pair of hooks and the step portion and by being butted of a bottom face and a side face of the head slider aligned block with a bottom face and a side face of the step portion, and the positioning of the head slider aligned block in the remaining one axial direction among XYZ is performed by moving the table in the remaining one axial direction along the longitudinal direction of the head slider aligned block mounted on the step portion.

2. The magnetic head slider testing apparatus according to claim 1, wherein the table is set at a predetermined reference position along the remaining one axial direction and through movement of the table from the predetermined reference position by a predetermined amount, the head slider aligned block is positioned in the remaining one axial direction.

3. The magnetic head slider testing apparatus according to claim 2, further comprising a magnetic field generating device that generates predetermined magnetic field at a gap in a core, wherein the step portion of the table of which width direction is provided along the remaining one axial direction opposes to the gap, the transfer mechanism causes to move the pair of hooks along the remaining one axial direction and transfers the head slider aligned block from the tray to the step portion, and the table advances and retreats with respect to the gap.

4. The magnetic head slider testing apparatus according to claim 3, wherein the remaining one axial direction is one of X direction and Y direction and the position where the hooks hang up the head slider aligned block from the tray and the position where the head slider aligned block is transferred above the step portion are on a same axial line along the remaining one axial direction, the head slider aligned block is roughly positioned by butting one of the end portions in longitudinal direction thereof to a wall face of the tray provided along the remaining one axial direction, and the transfer mechanism hangs up the head slider aligned block by lowering the hooks toward the tray, advancing and retreating the pair of hooks and raising the hooks from the tray.

5. The magnetic head slider testing apparatus according to claim 4, wherein the head slider aligned block is a row bar and the bottom face of the step portion assumes the reference face of Z direction and the side face thereof standing up from the bottom face assumes the reference face of the other of X direction and Y direction, and the moving amount of the table from the predetermined reference position corresponds to a protruding amount of an end portion in longitudinal direction of the head slider aligned block protruding from the width of the step portion.

6. The magnetic head slider testing apparatus according to claim 5, further comprising a camera, wherein the protruding amount of the end portion in longitudinal direction of the row bar is calculated based on an image obtained by imaging the end portion in longitudinal direction by the camera and the end portion in longitudinal direction of the row bar is corrected so as to assume a predetermined position in the remaining one axial direction through movement of the table.

7. The magnetic head slider testing apparatus according to claim 6, wherein the tray accommodates the many row bars respectively in an angle of 45° and is provided with groove holes to which the pair of hooks are inserted along the other of X direction and Y direction corresponding to the ends in longitudinal direction of the row bar, and the hook is a claw that includes an inclined portion of an angle of 45° for receiving the side in latitudinal direction of the row bar and a portion standing up from the inclined portion and having a shorter length than the inclined portion, is inserted into the groove holes, is advanced and retreated along the other of X direction and Y direction so as to position the claw below the row bar and is raised so as to hang up the row bar.

* * * * *